United States Patent
Radenac et al.

(10) Patent No.: US 8,020,376 B2
(45) Date of Patent: Sep. 20, 2011

(54) REGENERATION CONTROL METHOD FOR A PARTICLE FILTER

(75) Inventors: Erwan Radenac, Rochefort en Yvelines (FR); Marc Guyon, La Norville (FR)

(73) Assignee: Renault S.A.S., Boulogne Billancourt (FR)

(*) Notice: Subject to any disclaimer, the term of this patent is extended or adjusted under 35 U.S.C. 154(b) by 838 days.

(21) Appl. No.: 11/993,134

(22) PCT Filed: Jun. 21, 2006

(86) PCT No.: PCT/FR2006/050615
§ 371 (c)(1),
(2), (4) Date: Dec. 19, 2007

(87) PCT Pub. No.: WO2006/136754
PCT Pub. Date: Dec. 28, 2006

(65) Prior Publication Data
US 2010/0212289 A1  Aug. 26, 2010

(30) Foreign Application Priority Data
Jun. 21, 2005  (FR) .......... 05 06291

(51) Int. Cl.
*F01N 3/00* (2006.01)
*F01N 3/10* (2006.01)
(52) U.S. Cl. .......... 60/295; 60/286; 60/300
(58) Field of Classification Search .......... 60/295
See application file for complete search history.

(56) References Cited

U.S. PATENT DOCUMENTS

| | | | | |
|---|---|---|---|---|
| 5,751,602 A | * | 5/1998 | Maus et al. | 701/103 |
| 2003/0145582 A1 | * | 8/2003 | Bunting et al. | 60/297 |
| 2004/0204818 A1 | * | 10/2004 | Trudell et al. | 701/114 |
| 2004/0244362 A1 | * | 12/2004 | Hiranuma et al. | 60/276 |
| 2005/0143899 A1 | * | 6/2005 | Ueno et al. | 701/108 |
| 2006/0086095 A1 | | 4/2006 | Da-Silva et al. | |

FOREIGN PATENT DOCUMENTS

| | | |
|---|---|---|
| DE | 199 23 299 | 11/2000 |
| FR | 2 855 213 | 11/2004 |
| WO | 02 27162 | 4/2002 |

OTHER PUBLICATIONS

Kurth, J. et al., "Automation Strategies for a Particle Filter System for Diesel Engines", IEEE, pp. 127-132, 1994 (XP010131149).
U.S. Appl. No. 11/908,428, filed Feb. 26, 2008, Pillot, et al.

* cited by examiner

*Primary Examiner* — Thomas E Denion
*Assistant Examiner* — Jason Shanske
(74) *Attorney, Agent, or Firm* — Oblon, Spivak, McClelland, Maier & Neustadt, L.L.P.

(57) ABSTRACT

A regeneration control method for a particle filter of an internal combustion engine exhaust line determines operating data items of the particle filter, wherein the data items are at least one representative inside temperature T(t) of the filter at a time t, regenerates the filter by increasing the temperature thereof above a first combustion temperature threshold of a soot contained in the filter, and computes a time-varying parameter $d_{inst}(t)$ representative for the amount of energy produced at the time t by the regeneration process. The method further calculates a weighted parameter $D_{inst}$ weight (t), which is at least partially defined by the function of $d_{inst}(t) \ast Gtemp(t)$ or $Gtemp(t)$ and varying in time (t) according to the representative temperature T(t).

22 Claims, 2 Drawing Sheets

REGENERATION CONTROL METHOD FOR A PARTICLE FILTER

BACKGROUND

The present invention relates in general to a method of controlling the regeneration of a particulate filter.

More particularly, the invention relates to a method for controlling the regeneration of a particulate filter belonging to an exhaust line of an internal combustion engine, comprising:
the determination of particulate filter operating data, these data being at least a temperature $T(t)$ representative of the temperature inside the filter at a time t;
a step of regenerating the filter, consisting in raising the temperature of said filter above a first temperature threshold for combustion of soot contained in said filter;
the calculation of a parameter $d_{inst}(t)$ that can vary over time and is representative of the amount of energy produced at a time t by the regeneration process.

To reduce the amount of particles discharged into the atmosphere by internal combustion engines, it is known to place a particulate filter on the exhaust line for exhausting the burnt gases from the engine. This particulate filter must be regenerated in order to maintain its filtration characteristics—such a regeneration consists in increasing the temperature inside the filter in order to cause combustion of the soot contained in the filter.

It should be pointed out that the regeneration of a particulate filter may damage it and may impair its longevity.

This is the reason why many manufacturers of internal combustion engines fitted with an exhaust line equipped with a particulate filter have developed various solutions for controlling the filter regeneration process.

A regeneration control method of the type defined above, allowing such regeneration control, is for example described in patent document FR 2 855 213.

This document presents a method of controlling the regeneration of the filter during which a parameter $d_{inst}(t)$ that can vary over time and is representative of the amount of energy produced by the regeneration is calculated. This parameter $d_{inst}(t)$ consists of a ratio, being the calculated rate of soot combustion $V_r(t)$ as the mass of soot burnt per second divided by the exhaust gas flow rate $Q_m(t)$ as mass of exhaust gas. This is because the more rapid the combustion rate $V_r(t)$, the larger the amount of energy produced, at a given time t, by the combustion of the soot. Likewise, the higher the exhaust gas flow rate $Q_m(t)$, the more rapidly the soot combustion energy is removed.

Thus, the change in this calculated parameter $d_{inst}(t)$ is observed for determining whether it is necessary or not to interrupt the regeneration process to avoid a risk of degrading the filter.

BRIEF SUMMARY

Within this context, the object of the present invention is to propose a method of controlling the regeneration that allows the risk of damaging the particulate filter during its regeneration to be reduced.

For this purpose, the regeneration control method of the invention, which moreover complies with the generic definition that is given in the above preamble, is essentially characterized in that it includes a step of calculating a weighted parameter $D_{inst}wt(t)$, this weighted parameter being at least partly defined by the function $d_{inst}(t) \times Gtemp(t)$ where Gtemp(t) is variable in time (t) as a function of said representative temperature $T(t)$.

The fact of calculating a weighted parameter $D_{inst}wt(t)$ by multiplying the parameter $d_{inst}(t)$ by a function Gtemp(t), which is a function that can vary with the representative temperature $T(t)$, allows the change in the regeneration to be better evaluated so as, for example, to prevent any risk of damaging the filter. This is because the weighting of $d_{inst}(t)$ as a function of the temperature $T(t)$ takes better account of the amount of heat that can actually be removed from the filter by the gas flow.

For example, arrangements may be made so that the parameter $d_{inst}(t)$ is obtained by the formula:

$$d_{inst}(t) = \frac{V_r(t)}{Q_m(t)}$$

where $V_r(t)$ is the rate of combustion of soot contained in the particulate filter at the time t and $Q_m(t)$ is an estimated or measured exhaust gas mass flow rate at the time t. This parameter $d_{inst}(t)$ is particularly indicated in combination with the function Gtemp(t) for observing the change in the regeneration and for anticipating its behavior.

Arrangements may also be made to ensure that $d_{inst}(t)$ is obtained by the formula:

$$d_{inst}(t) = \frac{m_{soot}(t)_\beta \times k_0 \times \exp\left(\frac{E_a}{RT(t)}\right) \times P_{o2}^\alpha(t)}{Q_m(t)}$$

where:
$m_{soot}(t)$ is an estimate of the mass of soot contained in the filter at a time t;
$\beta$ is a partial order of reaction for soot combustion;
$k_0$ is a constant frequency factor;
$E_a$ is an activation energy dependent on the catalytic activity of the system, this activation energy representing the sensitivity to the temperature of the soot combustion reaction in the filter;
R is the perfect gas constant;
$P_{O2}(t)$ is an oxygen partial pressure at the time t expressed as a unit of pressure of oxygen in the gas contained in the filter, that is to say that $P_{O2}(t)=P_T \times X_{O2}$ where $P_T$ is the total pressure and $X_{O2}$ is the molar fraction of oxygen; and
$\alpha$ is a partial order of reaction for oxygen.

Arrangements may also be made to ensure that Gtemp(t) is obtained by any one of the formulae belonging to the group consisting of:
Gtemp=$T_s/T_e$ where $T_s$ and $T_e$ are gas outlet and inlet temperature, respectively, in the particulate filter at a time t;
Gtemp=$1/T_e$;
Gtemp=$1/(T_s-T_e)$;
Gtemp=$(1/T_e^2)$;
Gtemp=$1/T_i$, where $T_i$ is an internal temperature of the filter at a time t; and
Gtemp=$1/T_i^2$.

All these expressions for Gtemp allow Gtemp to be evaluated as a function of a temperature representative of the change in temperature within the filter at a given time t.

Thus, the representative temperature may be $T_e$, which is the temperature of the gases upstream of the particulate filter, i.e. at its inlet, or $T_i$, which is the temperature of the gases inside the filter, or else $T_s$, which is the temperature of the gases at the outlet of the filter.

In the case in which $Gtemp=T_s/T_e$, a temperature ratio, defining the amount of energy provided at a time t by the regeneration reaction, is then taken into account. This ratio may also be used to quantify the temperature difference $T_s-T_e$ across the terminals of the filter in order to evaluate the risk of damaging the filter due to the temperature different between the inlet and outlet.

In the case in which $Gtemp=T_e$, the temperature of the gases at the inlet of the filter is taken into account and it is thus possible to determine the difference between this temperature $T_e$ and a maximum permissible temperature for the filter. The higher the temperature $T_e$, the less the amount of heat produced by the regeneration can be removed.

In the case in which $T_i$ is used as the denominator in the representative function Gtemp, the heat produced by the engine on the one hand and the heat produced by the soot combustion during regeneration on the other hand are then taken into account.

Arrangements may also be made to ensure that $D_{inst}wt(t)= d_{inst}(t) \times Gtemp(t)$. In this case, only $d_{inst}(t)$ and $Gtemp(t)$ are taken into account for observing the change in the regeneration.

Arrangements may also be made to ensure that $$D_{inst}wt(t) = \sum_{t1}^{t2} d_{inst}(t) \times Gtemp(t)dt,$$

where t1 and t2 are the limits of a time interval of fixed duration and sliding over time.

Thanks to this function, the change over time of $d_{inst}(t)$ and of $Gtemp(t)$ is taken into account by calculating the sum of their instantaneous products at times t over a time interval between t1 and t2, where t1 and t2 have sliding values.

Arrangements may also be made to ensure that $D_{inst}wt(t)$ is equal to the derivative with respect to time t of $d_{inst}(t) \times Gtemp(t)$.

In this case, the slope of the curve defined by $d_{inst}(t) \times Gtemp(t)$ over time is calculated. The steeper this slope, the greater the risk of damaging the filter, as this would mean that it is subjected to large heat and temperature variations over very short time intervals.

Arrangements may also be made to ensure that if the calculated weighted parameter $D_{inst}wt(t)$ is:
  below a first threshold value, a controlled regeneration signal is emitted; and/or
  above said first threshold value and below a second threshold value, a first filter degradation risk signal is emitted; and/or
  above said second threshold value, an uncontrolled regeneration signal is emitted.

By setting predefined threshold values and by comparing these values with the calculated criterion $D_{inst}wt(t)$, as described above, it is then possible to emit a signal indicating schematically that there is a greater or lesser risk of damaging the filter.

Arrangements may also be made to ensure that the method includes a step of stopping the regeneration, consisting in interrupting the regeneration if the calculated weighted parameter $D_{inst}wt(t)$ is above a predetermined stop threshold value.

This predetermined stop threshold value is preferably between the first and second threshold values and may be equal to the first threshold value.

This feature makes it possible to reduce the risk of degrading the particulate filter by a loss of control of the regeneration, which is manifested by overheating and/or a sudden and uncontrollable rise in pressure/temperature inside the filter.

Arrangements may also be made to ensure that values taken over time t by the calculated weighted parameter $D_{inst}wt(t)$ are stored in a memory.

By storing these values in memory it is possible to have a history representative of the operation of the particulate filter. Such a history allows an indication about the level of wear of the particulate filter to be obtained and possibly about the average time left for using the filter before it malfunctions.

BRIEF DESCRIPTION OF THE DRAWINGS

Other features and advantages of the invention will become more clearly apparent from the description given below by way of entirely nonlimiting indication, with reference to the appended drawings in which.

DETAILED DESCRIPTION

Figure 1:
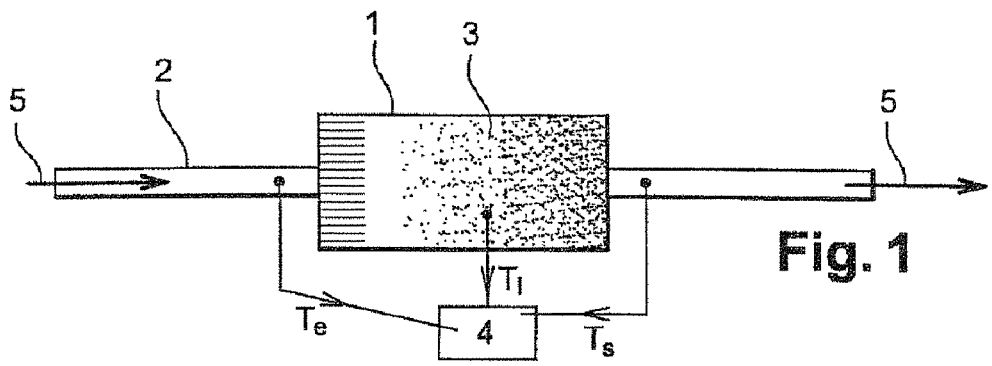
FIG. 1 shows a device suitable for implementing a method of the invention.

Referring to FIG. 1, the exhaust line 2 is connected to an engine (not shown) which delivers burnt gases 5 into the line.

The filter 1 is progressively laden with particles 3 entrained with the burnt gases.

A computer 4 is connected to sensors for collecting data about the particulate filter 1. Here, the measured data are the gas inlet temperature downstream of the filter, the internal temperature $T_i$ of the gases in the filter, and the gas outlet temperature $T_s$ of the filter. These temperature parameters are collected by three separate sensors connected to the computer 4.

Other parameters are also measured or estimated, and are transmitted to the computer 4. Such measured or estimated parameters are the mass flow rate of exhaust gas coming from the engine, the oxygen partial pressure and the mass of soot in the particulate filter.

Using these parameters, the computer generates a parameter $d_{inst}(t)$ which is representative of the change in the regeneration.

This parameter $d_{inst}(t)$ is the ratio at each time t of $V_r(t)$, of the rate of soot combustion, i.e. the mass of soot burnt at a time t (for example in grams per second or moles per second), divided by the mass flow rate $Q_m(t)$ of burnt gases coming from the engine and passing through the filter.

The larger the amount of burnt gases flowing, the greater the amount of heat that can be removed from the filter—the parameter $d_{inst}(t)$ is therefore minimized by the mass flow rate $Q_m(t)$.

In general, $Q_m(t)$ is estimated from a measurement of the amount of air inducted at a time t into the engine and from the amount of fuel injected into the engine. The unit of $Q_m(t)$ is the mass of soot burnt per unit time, i.e. kg/s.

This ratio $d_{inst}(t)$ therefore provides an indication of the amount of heat that can be removed from the filter at a time t.

Thanks to the invention, this ratio is weighted by calculating a weighted parameter $D_{inst}wt(t)$, defined by the function $d_{inst}(t) \times Gtemp(t)$ where $Gtemp(t)$ can vary over time t according to the representative temperature $T(t)$, this representative temperature being for example the gas inlet temperature $T_e$ of the filter and/or the gas temperature $T_i$ in the filter and/or the gas outlet temperature $T_s$ of the filter.

Specifically, the weighting of $d_{inst}(t)$ at a time t as a function of a temperature parameter allows the change in filter regeneration to be better displayed.

To calculate this weighted parameter $D_{inst}\text{wt}(t)$, the following formula is used:

$$V_r(t)\Delta H = Q_m(t) Cp_{ex}(T_e(t) - T_s(t))$$

where $Cp_{ex}$ is the specific heat of the exhaust gases, expressed in kelvin per mole, and $\Delta H$ is the enthalpy of combustion per unit mass of soot, expressed in joules per kelvin per mole of soot. The following formulae are also used:

$$\Delta T(t) = K \frac{V_r(t)}{Q_m(t)} \text{ with } K = \frac{\Delta H(t)}{Cp_{ex}},$$

where K is a constant, and $$d_{inst}(t) = \frac{V_r(t)}{Q_m(t)} = \frac{m_{soot}(t)_\beta \times k_0 \times \exp\left(\frac{E_a}{RT(t)}\right) \times P_{o2}^\alpha(t)}{Q_m(t)},$$

where here the mass of soot $m_{soot}(t)$ in the filter is expressed in g and is a value estimated by the computer 4. This mass may be estimated by:

analyzing the amount of fuel consumed by the engine; and/or analyzing the backpressure at the terminals of the filter, which is an indication about the clogging of the filter by the soot and therefore an indirect estimation of the mass of soot in the filter.

$\beta$ is the partial order of reaction for soot and is obtained by laboratory trials.

$k_0$ is the constant frequency factor or pre-exponential factor.

$E_a$ is the activation energy, which is a function of the catalytic activity of the system. This energy represents the sensitivity to the temperature of the carbon+oxygen→$CO_2$ reaction. $E_a$ is expressed in joules per mole of soot.

R is the perfect gas constant, which is about 8.314.

T(t) is the temperature in kelvin in the filter at the time t. This temperature T(t) is the internal temperature, also called $T_i$.

$P_{O2}(t)$ is the oxygen partial pressure at the time t and represents the amount of oxygen in the burnt gases 5 at the inlet of the filter. This amount is measured by a sensor or estimated from the engine parameters.

$\alpha$ is a partial order of reaction for oxygen.

To calculate $D_{inst}\text{wt}(t)$, a function is used in which $D_{inst}\text{wt}(t)$ is expressed by means of $d_{inst}(t)$ and Gtemp(t).

To do this, Gtemp(t) is chosen from:

Gtemp=$T_s/T_e$ where $T_s$ and $T_e$ are gas outlet and inlet temperature, respectively, in the particulate filter at a time t or;

Gtemp=$1/T_e$ or;

Gtemp=$1/(T_s-T_e)$ or;

Gtemp=$(1/T_e^2)$ or;

Gtemp=$1/T_i$, where $T_i$ is an internal temperature of the filter at a time t or;

Gtemp=$1/T_i$.

$D_{inst}\text{wt}(t)$ may be calculated:
either by $D_{inst}\text{wt}(t) = d_{inst}(t) \times \text{Gtemp}(t)$;
or by $$D_{inst}\text{wt}(t) = \sum_{t1}^{t2} d_{inst}(t) \times \text{Gtemp}(t) dt;$$

or by the derivation with respect to time t of $d_{inst}(t) \times \text{Gtemp}(t)$.

Preferably:

$$D_{inst}\text{wt}(t) = d_{inst}(t) \times T_i(t),$$

where $T_i$ is the internal temperature of the gas in the filter.

The latter weighted parameter is extremely representative of the operating conditions of the filter.

Figure 2:
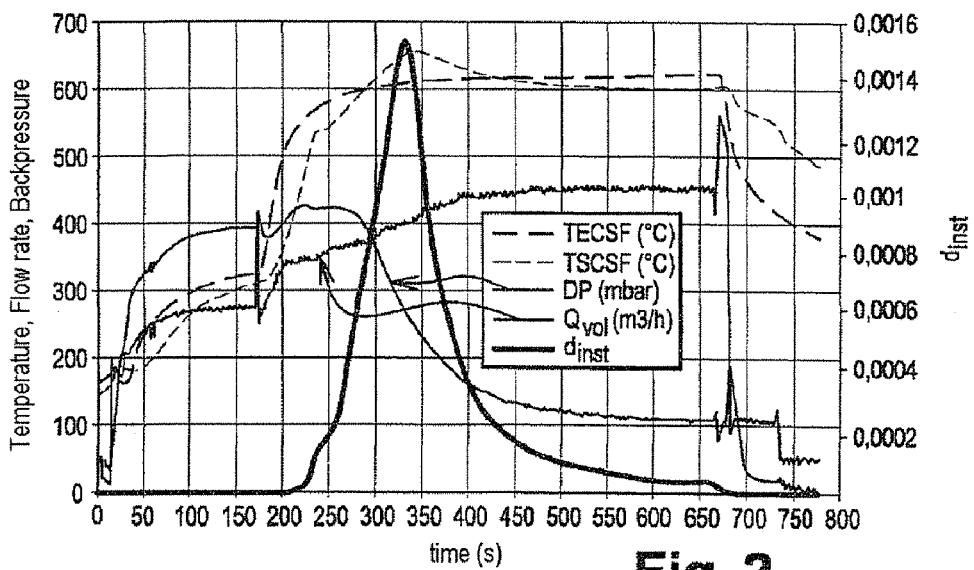
FIGS. 2 to 4 show graphs of the variation in the exhaust line parameters as a function of time, FIG. 2 corresponding to a normal regeneration, FIG. 3 representing a transition regeneration, and FIG. 4 representing an uncontrolled regeneration with risk of damaging the particulate filter.

FIG. 2 illustrates the variation of the parameters in the case of controlled regeneration. Here, $d_{inst}(t)$ remains equal to 0 until the regeneration is initiated. Once regeneration has been initiated, $d_{inst}(t)$ increases until it reaches a maximum value of 0.0016. This increase in $d_{inst}(t)$ occurs over a time interval of around 150 seconds and this maximum value of $d_{inst}(t)$ indicates that the regeneration is controlled. At the same time, the gas outlet temperature of the filter increases from about 100° C. until it reaches 660° C. Over this same time interval, the differential pressure, expressed in millibars, between the inlet and the outlet of the filter drops, whereas the volume flow of gas flowing through the filter increases. The latter point indicates that the filter is becoming progressively clogged.

As long as the values of $d_{inst}(t)$ are below 0.02, which is the case here in FIG. 2, then the regeneration is controlled and there is no danger of damaging the particulate filter.

Figure 3:
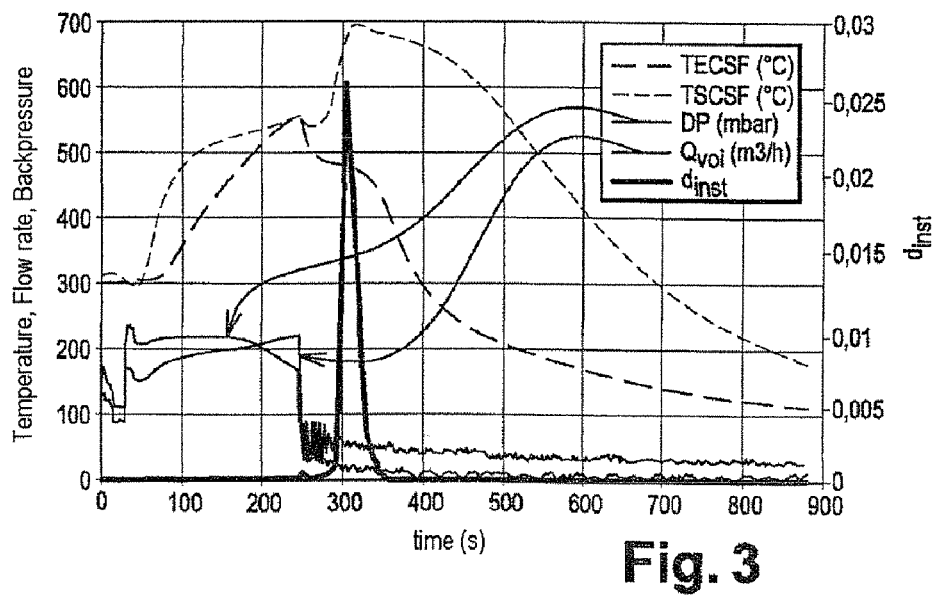

When the values of $d_{inst}(t)$ are above 0.02 but below 0.03, which is the case in FIG. 3, then there is a risk of losing control of the filter regeneration and the thermal levels may prove to be too high (close to 700° C.). In this case, it is often necessary to intervene by engine adjustment in order to interrupt or regulate the regeneration in progress.

Figure 4:
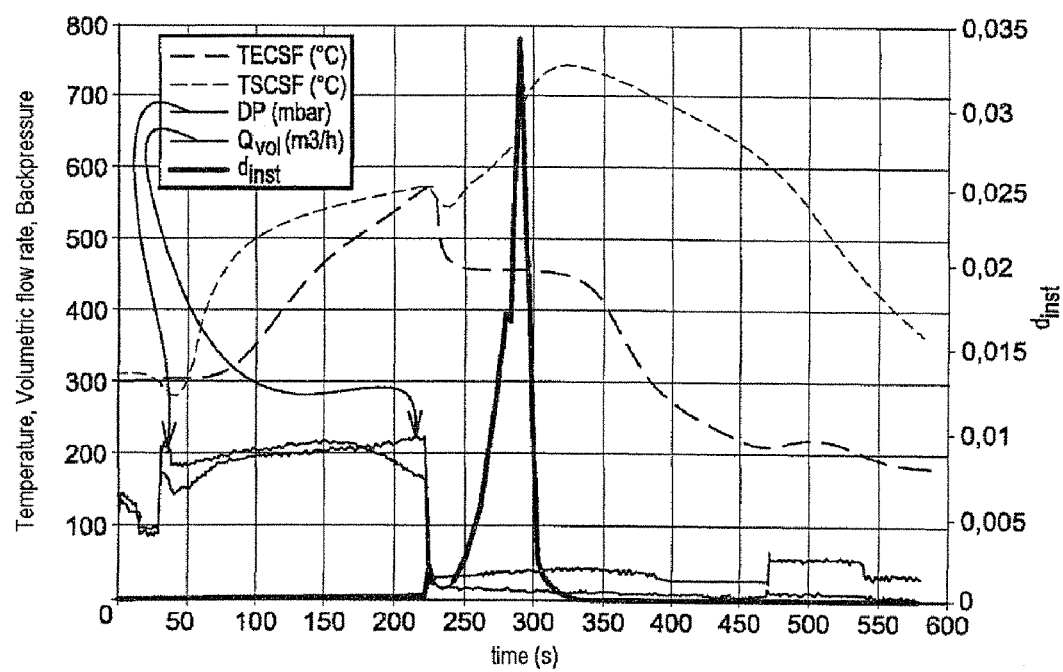

When the values of $d_{inst}(t)$ are above 0.03, which is the case in FIG. 4, it is known that regeneration is no longer controllable and there is a major risk of damaging the particulate filter.

This is because the more the parameter $d_{inst}(t)$ increases, the more violent the reaction taking place in the filter. Thus, in the case in FIG. 4, $d_{inst}(t)$ passes from 0 to 0.034 in less than 100 seconds. Over the same time, the temperature $T_s$ of the gases leaving the filter increases dangerously and exceeds the 700° C. limit, reaching up to 780° C.

Thanks to the invention, it is therefore possible to weight $d_{inst}(t)$ so as to make it easier to read the regeneration reaction and thus avoid the situation shown in FIG. 4.

The invention claimed is:

1. A method for controlling regeneration of a particulate filter belonging to an exhaust line of an internal combustion engine, comprising:

determining particulate filter operating data including at least a temperature T(t) representative of the temperature inside the filter at a time t;

regenerating the filter, including raising the temperature of the filter above a first temperature threshold for combustion of soot contained in the filter;

calculating a parameter $d_{inst}(t)$ that can vary over time and is representative of an amount of energy produced at a time t by the regenerating of the filter; and calculating a weighted parameter $D_{inst}\text{wt}(t)$ at least partly defined by the function $d_{inst}(t) \times \text{Gtemp}(t)$, in which Gtemp (t) is a variable in time (t) as a function of the representative temperature T(t),
wherein $d_{inst}(t)$ is obtained by formula:

$$d_{inst}(t) = \frac{m_{soot}(t)_\beta \times k_0 \times \exp\left(\frac{E_a}{RT(t)}\right) \times P_{o2}^\alpha(t)}{Q_m(t)}$$

in which:
$m_{soot}(t)$ is an estimate of mass of soot contained in the filter at a time t;
β is a partial order of reaction for soot combustion;
$k_0$ is a constant frequency factor;
$E_a$ is an activation energy dependent on catalytic activity of the filter, the activation energy representing sensitivity to temperature of the soot combustion reaction in the filter;
R is a perfect gas constant;
$P_{o2}(t)$ is an oxygen partial pressure at the time t expressed as a mass percentage of oxygen in the gas contained in the filter at the time t; and
α is a partial order of reaction for oxygen.

2. The method as claimed in claim 1, wherein if the calculated weighted parameter $D_{inst}$wt (t) is:
below a first threshold value, a controlled regeneration signal is emitted; and/or
above the first threshold value and below a second threshold value, a first filter degradation risk signal is emitted; and/or
above the second threshold value an uncontrolled regeneration signal is emitted.

3. The method as claimed in claim 1, further comprising stopping the regeneration, including interrupting the regeneration if the calculated weighted parameter $D_{inst}$wt (t) is above a predetermined stop threshold value.

4. The method as claimed in claim 1, wherein values taken over time t by the calculated weighted parameter $D_{inst}$wt (t) are stored in a memory.

5. A method for controlling regeneration of a particulate filter belonging to an exhaust line of an internal combustion engine, comprising:
determining particulate filter operating data including at least a temperature T(t) representative of the temperature inside the filter at a time t;
regenerating the filter, including raising the temperature of the filter above a first temperature threshold for combustion of soot contained in the filter;
calculating a parameter $d_{inst}(t)$ that can vary over time and is representative of an amount of energy produced at a time t by the regenerating of the filter; and
calculating a weighted parameter $D_{inst}$wt (t) at least partly defined by the function $d_{inst}(t) \times$ Gtemp (t), in which Gtemp (t) is a variable in time (t) as a function of the representative temperature T(t),
wherein Gtemp(t) is obtained by any one of the formulae belonging to the group consisting of:
Gtemp=$T_s/T_e$, in which $T_s$ and $T_e$ are gas outlet and inlet temperature, respectively, in the particulate filter at a time t;
Gtemp=$1/T_e$;
Gtemp=$1/(Ts-T_e)$;
Gtemp=$(1/T_e^2)$;
Gtemp=$1/T_i$, in which $T_i$ is an internal temperature of the filter at a time t; and
Gtemp=$1/T_i^2$.

6. The method as claimed in claim 5, wherein the parameter $d_{inst}(t)$ is obtained by formula:

$$d_{inst}(t) = \frac{V_r(t)}{Q_m(t)}$$

in which $V_r(t)$ is rate of combustion of soot contained in the particulate filter at the time t and $Q_m(t)$ is an estimated or measured exhaust gas mass flow rate at the time t.

7. The method as claimed in claim 5, wherein $$D_{inst}\text{wt }(t) \times \text{Gtemp}(t).$$

8. The method as claimed in claim 5, wherein if the calculated weighted parameter $D_{inst}$wt (t) is:
below a first threshold value, a controlled regeneration signal is emitted; and/or
above the first threshold value and below a second threshold value, a first filter degradation risk signal is emitted; and/or
above the second threshold value an uncontrolled regeneration signal is emitted.

9. The method as claimed in claim 5, further comprising stopping the regeneration, including interrupting the regeneration if the calculated weighted parameter $D_{inst}$wt (t) is above a predetermined stop threshold value.

10. The method as claimed in claim 5, wherein values taken over time t by the calculated weighted parameter $D_{inst}$wt (t) are stored in a memory.

11. A method for controlling regeneration of a particulate filter belonging to an exhaust line of an internal combustion engine, comprising:
determining particulate filter operating data including at least a temperature T(t) representative of the temperature inside the filter at a time t;
regenerating the filter, including raising the temperature of the filter above a first temperature threshold for combustion of soot contained in the filter;
calculating a parameter $d_{inst}(t)$ that can vary over time and is representative of an amount of energy produced at a time t by the regenerating of the filter; and
calculating a weighted parameter $D_{inst}$wt (t) at least partly defined by the function $d_{inst}(t) \times$ Gtemp (t), in which Gtemp (t) is a variable in time (t) as a function of the representative temperature T(t),
wherein $$D_{inst}wt(t) = \sum_{t1}^{t2} d_{inst}(t) \times Gtemp(t) dt,$$

in which t1 and t2 are limits of a time interval of fixed duration and sliding over time.

12. The method as claimed in claim 11, wherein the parameter $d_{inst}(t)$ is obtained by formula:

$$d_{inst}(t) = \frac{V_r(t)}{Q_m(t)}$$

in which $V_r(t)$ is rate of combustion of soot contained in the particulate filter at the time t and $Q_m(t)$ is an estimated or measured exhaust gas mass flow rate at the time t.

13. The method as claimed in claim 11, wherein $D_{inst}\text{wt}(t)=d_{inst}(t)\times\text{Gtemp}(t)$.

14. The method as claimed in claim 11, wherein if the calculated weighted parameter $D_{inst}\text{wt}(t)$ is:
- below a first threshold value, a controlled regeneration signal is emitted; and/or
- above the first threshold value and below a second threshold value, a first filter degradation risk signal is emitted; and/or
- above the second threshold value an uncontrolled regeneration signal is emitted.

15. The method as claimed in claim 11, further comprising stopping the regeneration, including interrupting the regeneration if the calculated weighted parameter $D_{inst}\text{wt}(t)$ is above a predetermined stop threshold value.

16. The method as claimed in claim 11, wherein values taken over time t by the calculated weighted parameter $D_{inst}\text{wt}(t)$ are stored in a memory.

17. A method for controlling regeneration of a particulate filter belonging to an exhaust line of an internal combustion engine, comprising:
- determining particulate filter operating data including at least a temperature T(t) representative of the temperature inside the filter at a time t;
- regenerating the filter, including raising the temperature of the filter above a first temperature threshold for combustion of soot contained in the filter;
- calculating a parameter $d_{inst}(t)$ that can vary over time and is representative of an amount of energy produced at a time t by the regenerating of the filter; and
- calculating a weighted parameter $D_{inst}\text{wt}(t)$ at least partly defined by the function $d_{inst}(t)\times\text{Gtemp}(t)$, in which Gtemp (t) is a variable in time (t) as a function of the representative temperature T(t), wherein $D_{inst}\text{wt}(t)$ is equal to the derivative with respect to time t of $d_{inst}(t)\times\text{Gtemp}(t)$.

18. The method as claimed in claim 17, wherein the parameter $d_{inst}(t)$ is obtained by formula:

$$d_{inst}(t) = \frac{V_r(t)}{Q_m(t)}$$

in which $V_r(t)$ is rate of combustion of soot contained in the particulate filter at the time t and $Q_m(t)$ is an estimated or measured exhaust gas mass flow rate at the time t.

19. The method as claimed in claim 17, wherein $D_{inst}\text{wt}(t)=d_{inst}(t)\times\text{Gtemp}(t)$.

20. The method as claimed in claim 17, wherein if the calculated weighted parameter $D_{inst}\text{wt}(t)$ is:
- below a first threshold value, a controlled regeneration signal is emitted; and/or
- above the first threshold value and below a second threshold value, a first filter degradation risk signal is emitted; and/or
- above the second threshold value an uncontrolled regeneration signal is emitted.

21. The method as claimed in claim 17, further comprising stopping the regeneration, including interrupting the regeneration if the calculated weighted parameter $D_{inst}\text{wt}(t)$ is above a predetermined stop threshold value.

22. The method as claimed in claim 17, wherein values taken over time t by the calculated weighted parameter $D_{inst}\text{wt}(t)$ are stored in a memory.

\* \* \* \* \*